United States Patent
Basom et al.

(10) Patent No.: US 9,944,570 B1
(45) Date of Patent: Apr. 17, 2018

(54) DESENSITIZING AGENT FOR HOMEMADE AND CONVENTIONAL EXPLOSIVES

(71) Applicants: Kenneth Basom, Waldorf, MD (US); Bryan Milani, Waldorf, MD (US)

(72) Inventors: Kenneth Basom, Waldorf, MD (US); Bryan Milani, Waldorf, MD (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 215 days.

(21) Appl. No.: 13/999,385

(22) Filed: Feb. 20, 2014

(51) Int. Cl.
  *C06B 21/00* (2006.01)
  *C08L 23/22* (2006.01)
  *C08K 5/521* (2006.01)
  *B09B 3/00* (2006.01)

(52) U.S. Cl.
  CPC ........ *C06B 21/0091* (2013.01); *B09B 3/0033* (2013.01); *C08K 5/521* (2013.01); *C08L 23/22* (2013.01)

(58) Field of Classification Search
  CPC ..................................................... C06B 21/00
  See application file for complete search history.

(56) References Cited

U.S. PATENT DOCUMENTS

| | | | |
|---|---|---|---|
| 3,728,170 A * | 4/1973 | Stoff | C06B 45/10 149/105 |
| 5,434,336 A | 7/1995 | Adams et al. | |
| 5,456,729 A | 10/1995 | Villamagna et al. | |
| 5,750,921 A * | 5/1998 | Chan | C06B 21/0041 149/11 |
| 7,077,044 B2 | 7/2006 | Badger et al. | |
| 2011/0081723 A1 * | 4/2011 | Miller | G01N 21/6428 436/56 |
| 2012/0090744 A1 | 4/2012 | Waldvogel et al. | |
| 2013/0109103 A1 | 5/2013 | Waldvogel et al. | |

* cited by examiner

*Primary Examiner* — Aileen B Felton
(74) *Attorney, Agent, or Firm* — Fredric Zimmerman

(57) ABSTRACT

A desensitizing agent and method which desensitizes triacetone triperoxide (TATP). The agent includes a common polymer dissolved in a volatile solvent, which allows for direct, rapid application on-site, providing for safer movement and transport of the explosive. Drop heights in impact test results of treated TATP were twice that of neat TATP or TATP treated with conventional agents. The agent is composed of non-toxic, inexpensive components with the polymer delivered in a solvent vehicle, which quickly volatilizes after application and exhibits compatibility with TATP and conventional explosives.

7 Claims, No Drawings

DESENSITIZING AGENT FOR HOMEMADE AND CONVENTIONAL EXPLOSIVES

STATEMENT OF GOVERNMENT INTEREST

The present invention described herein may be manufactured and used by or for the Government of the United States of America for governmental purposes without the payment of any royalties thereon or therefore.

FIELD OF THE DISCLOSURE

The present disclosure relates generally to desensitizing explosives. More particularly, the present disclosure relates to a desensitizing agent and method for improvised and conventional explosives.

BACKGROUND OF THE DISCLOSURE

The frequency use of improvised, or homemade, explosives (HME) in various Theatres of Operation has presented challenges to Explosive Ordnance Disposal (EOD) personnel. Aside from the danger inherent in the execution of render safe procedures (RSPs) when dealing with an Improvised Explosive Device (IED), devices containing HME can be extremely sensitive to stimuli such as impact, friction, and electrostatic discharge (ESD) due to the native instability of the materials or the inclusion of artifacts of manufacture sensitizing the explosive. Often, these materials are not present in a format where they can be rendered safe using remote procedures, such as blow-in-place (BIP). In such cases, EOD personnel are required to collect and transport the materials prior to disposal and will be at risk due to hazards associated with handling of HMEs. Conventionally, EOD personnel can use Liquid Safeing Fluids (LSFs) such as WD-40, automatic transmission fluid (ATF), diesel fuel, a mixture of alcohol and water, etc. to provide some measure of desensitization to friction and ESD, primarily, due to their availability in the field rather than for empirical reasons. These conventional approaches do not mitigate the effect of impact as some could act as a fuel component increasing sensitivity, and require a large amount to be marginally effective.

BRIEF SUMMARY OF THE DISCLOSURE

In an exemplary embodiment, a desensitizing method for desensitizing improvised and conventional explosives includes applying a desensitizing agent, including a solution of polyisobutylene and a dispersing agent in a mixture of organic solvents to an explosive; and allowing the desensitizing agent to dry to encapsulate the explosive in a polymeric mass thereby insulating the explosive from impact, friction, and electrostatic discharge. The desensitizing method may further include applying the desensitizing agent as a liquid or an aerosol. The explosive may include triacetone triperoxide (TATP). The dispersing agent may include lecithin. The solution, may include a 20% concentration of polyisobutylene. The solution may include a 2% concentration of the dispersing agent. The solution may include a 20% concentration of polyisobutylene; and a 2% concentration of lecithin. The mixture of organic solvents may include acetone/petroleum ether.

In another exemplary embodiment, a desensitizing agent for desensitizing improvised and conventional explosives includes a solution of polyisobutylene and a dispersing agent in a mixture of organic solvents in either a liquid or an aerosol form for application to an explosive in order to insulate the explosive from impact, friction, and electrostatic discharge. The explosive may include triacetone triperoxide (TATP). The dispersing agent may include lecithin. The solution may include a 20% concentration of polyisobutylene. The solution may include a 2% concentration of the dispersing agent. The solution may include a 20% concentration of polyisobutylene; and a 2% concentration of lecithin. The mixture of organic solvents may include acetone/petroleum ether.

In yet another exemplary embodiment, a method of desensitizing triacetone triperoxide (TATP) on-site includes obtaining a desensitizing agent including a solution of polyisobutylene and lecithin in a mixture of organic solvents to an explosive including TATP; applying the desensitizing agent on-site via as a liquid or aerosol to the TATP; allowing the desensitizing agent to dry for one or more minutes; and handling the TATP encapsulated by the desensitizing agent with insulation from impact, friction, and electrostatic discharge.

DETAILED DESCRIPTION OF THE DISCLOSURE

In various exemplary embodiments, the present disclosure relates to Desensitization Agents including a polymeric solution and dispersing agent in a solvent (a phlegmatizing agent) to desensitize explosives for safe transport and handling during render safe procedures. The agent and method desensitizes improvised and conventional explosives to impact, ESD, and friction; is composed of non-toxic, inexpensive components; requires a relatively small amount to desensitize explosives; may be in an easily dispensed, portable format allowing for quick application on site; and is chemically compatible with explosives. The agent is a solution of a polymer (polyisobutylene) and a dispersing agent (lecithin) in a mixture of organic solvents (acetone/petroleum ether). It may be applied to an explosive mass as a liquid or aerosol. Upon drying, the explosive is encapsulated in the polymeric mass insulating it from friction, ESD, and impact. The polymer is composed of long, straight chain molecules with only single bonds allowing freedom of movement and providing shock absorbing ability. The lack of bulky pendant groups imbuing the material with adhesive properties allowing it to bond to crystalline explosives. In testing, the agent described herein was shown to desensitize, effectively, peroxide HMEs (triacetone triperoxide, TATP) to impact (e.g., effectively halving the sensitivity), provide greater desensitization to friction and ESD due to insulating properties, and does not add appreciably volume or weight to a treated mass.

Among the most sensitive of HMEs is TATP illustrated below in DRAWING 1. TATP is popular amongst illicit users due to the ease of manufacture and the ability to initiate without the use of explosive boosters. TATP has been used in several Theatres of Operation and terrorist attacks, and the compounds sensitivity towards stimuli renders it particularly hazardous to EOD personnel. Due to the nature of the compound, the material's decomposition is entropic rather than exothermic with volume work converted to heat to sustain and explosion. Therefore, LSFs do not provide effective desensitization of TATP. For example, research has shown that TATP treated with WD-40 at concentrations from 10-30% (w/w) displays the same sensitivity to impact as neat TATP.

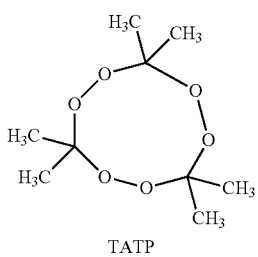

TATP

Desensitizing agents used in conventional ordinance are termed phlegmatizers. Phlegmatization may be obtained through gelatinization such as the absorption of nitroglycerin into nitrocellulose in double base propellant or afforded by types of materials such as polymers, as with polyisobutylene (PIB) used in C-4, where they act to desensitize the explosive fraction and allow for solids loading of the explosive in a useful format. Waxes such a Candelilla and Beeswax have also been used as phlegmatizers in explosives such as Composition B. Conventional phlegmatized explosive mixtures display marked drops in sensitivity compared to neat explosives.

Owing to the molecular structure of the PIB illustrated below in DRAWING. 2, an extremely long chain containing only single bonds, the material is imbued with a high degree of flexibility acting as a molecular "spring" dissipating impact forces. The absence of bulk pendant groups allows the chains to layer and adhere to the interstitial surfaces of crystals, thereby reducing sensitivity towards friction and providing multi-dimensional shock absorbing qualities. The dielectric properties of the material diminish ESD sensitivity as the material is used in commercial electrical insulators.

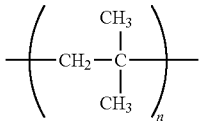

Polyisobutylene (PIB) Monometric Unit

The mechanism of desensitization by waxes, such as Beeswax, is not as readily defined as that of PIB. While Beeswax's action to reduce sensitivity to friction and ESD would be expected to mimic that of PIB, its action towards impact stimuli is more complex. The brittle wax would not be expected to dissipate the mechanical forces of impact. Used to desensitize PETN (pentaerythritiol tetranitrate), however a four-fold reduction in impact sensitivity was realized with the addition of just 13% (w/w) synthetic Beeswax. One possible mechanism of action states that the mechanical energy from impact degrades into thermal energy which forms a "hot spot" and propagation into an explosion proceeds by a thermal mechanism. The wax, therefore, does not lower the incidence of initiation but inhibits propagation into an explosion by acting as a transient thermal insulator.

The present disclosure relates to a phlegmatizing agent to desensitize, effectively, conventional and improvised explosives allowing for safe transport and handling during render safe procedures by EOD. The phlegmatizing agent possesses the following qualities. First, it includes an ability to decrease the sensitivity of conventional and improvised explosives to impact, friction, and ESD. Second, it is composed of non-toxic and inexpensive components. Third, it requires a relatively small amount to achieve desensitization. Fourth, it is in an easily dispensed, portable form to allow for quick, thorough application on site. Finally, it is chemically compatible with conventional and improvised explosives.

PIB and Beeswax were selected as candidate phlegmatizers due to the aforementioned properties of the materials and to evaluate the differing mechanisms of desensitization. Both materials and the solvent vehicle used herein comply with the stated objective above. TATP is used herein as a test explosive due to its remarkable sensitivity to stimuli, particularly to impact, as it is arguably the most sensitive of all improvised explosives. It is also an objective herein to lower the sensitivity out of the realm of primary explosives into levels indicative of secondary explosives. It is expected that achieving the aforementioned objectives against TATP would also be effective against less sensitive explosives.

Standardized sensitivity testing and thermal analysis for compatibility were used to provide common measures of sensitivity and compatibility for comparison with other explosives and mixtures. The test protocols used were the same employed for the testing of conventional explosives.

Materials

In an exemplary embodiment, the materials used include TATP; polyisobutylene (PIB), Vistanex™ obtained from Holston AAP, Kingsport, Tenn.; petroleum ether, ACS grade, Fisher brand, obtained from Fisher Scientific; Acctone, lecithin, Walmart brand gel capsules, obtained from Walmart; Beeswax, native, top cap, obtained from a local retailer in Maryland; Sodium chloride, commercial grade, Morton's brand, obtained from a local retailer; a photomicroscope with video feed; and a UV lamp.

Methodology—Preparation of Stock Solutions

A PIB stock solution was prepared by dissolving an appropriate amount of PIB under constant stirring in 10% acetone/petroleum ether (v/v) to obtain a 24 mg/ml concentration of PIB. A PIB with lecithin stock solution was prepared by extracting from a gel capsule with a syringe and adding to an appropriate amount of PIB solution to obtain a concentration equal to 2% (w/w) of the PIB concentration. Subsequent stock solutions of PIB with lecithin were composed with sufficient lecithin to obtain a concentration equivalent to 5.2% of the PIB concentration.

A Beeswax stock solution was obtained by dissolving 4.8 grams of the top cap Beeswax in 200 ml 10% acetone/petroleum ether under constant stirring. Sufficient lecithin was added to the solution to obtain a concentration equivalent to 5.2% (w/w) of the Beeswax concentration. A 50/50 PIB/Beeswax stock solution was made by mixing equal volumes of the prior two stock solutions.

Actual Methodology—Preparation of TATP Test Samples 1 gram specimens of TATP were used in all preparation. Aliquots of stock solutions were directly added to samples and the solvent allowed to evaporate to generate agent concentrations as listed in Table 1 below.

TABLE 1

| Agent Concentrations | | |
|---|---|---|
| PIB | Beeswax | Lecithin |
| 10 | 0 | 2 |
| 14 | 0 | 2 |

TABLE 1-continued

Agent Concentrations

| PIB | Beeswax | Lecithin |
|---|---|---|
| 14 | 0 | 0 |
| 20 | 0 | 2 |
| 30 | 0 | 5.2 |
| 30 | 0 | 0.3 |
| 30 | 0 | 0 |
| 0 | 10 | 5.2 |
| 0 | 15 | 5.2 |
| 0 | 20 | 5.2 |
| 0 | 30 | 5.2 |
| 5 | 5 | 5.2 |
| 7.5 | 7.5 | 5.2 |
| 10 | 10 | 5.2 |
| 15 | 15 | 5.2 |

Evaluation of Candidate Solutions

Aliquots of solutions of PIB and PIB with lecithin were added to masses of sodium chloride on glass slides and examined using video photomicroscopy to determine the degree of encapsulation of the masses. Masses of sodium chloride approximating 1 gram were covered with the solutions and allowed to dry for approximately 6 minutes. The microscope field was observed during the drying process and during mechanical manipulation of the resulting masses.

Evaluation of Test Samples

Test samples underwent testing for sensitivity to impact or a combination of impact, friction, and ESD in accordance with SOPs P30981, P30979, and P30995. Impact testing utilized a 1 kg drop weight. Select test specimens underwent stability testing by Differential Scanning calorimetry (DSC).

Results and Discussion—Photomicroscopy

Microscopic examination of masses of crystals treated with PIB and PIB with lecithin indicated both solutions provided a substantial degree of encapsulation to the majority of crystals in the field. In general, the material with the surfactant appeared to coat the test specimens more completely when compared with the solution without the surfactant. The slight reduction in viscosity of the solution due to the surfactant appeared to provide for more facile flow in the interstitial spaces of the salt crystals.

The degree of coverage of Beeswax emulsions were also examined by photomicroscopy. The Beeswax/lecithin did not appear to provide the degree of coverage or resilience afforded by the PIB solutions with areas of the observed crystals appearing to having different degrees of coverage. The mixture of Beeswax and PIB (50/50) appeared to have a degree of coverage intermediate to the PIB and Beeswax solutions with areas of inconsistent coverage of the crystalline surfaces. The compression and rebound of the sample masses treated with the PIB/Beeswax exhibited greater resilience than masses treated with only PIB.

Results and Discussion—Sensitivity Testing

Initial impact testing of test samples included testing samples treated with PIB with and without lecithin. Table 2 below summarizes the results of the testing.

TABLE 2

| Results of the Initial Impact Testing | |
|---|---|
| Agent | Impact Results |
| 10% PIB/2% lecithin | 7 cm |
| 14% PIB/2% lecithin | 10 cm |
| 14% PIB | 11 cm |
| 20% PIB/2% lecithin | 13 cm |

As can be seen in the table above, an increase in the amount of PIB increased the resistance to impact with greater drop distances required to initiate the compositions using the 1 kg drop weight. For comparison, neat TATP has an impact result of 5.7 cm and TATP with 20% and 30% WD-40 have impact results of 5.7 and 5.2 cm, respectively. The sensitivity at the 20% PIB concentration was less than half that of neat TATP or TATP treated with WD-40.

The relationship between impact results and PIB concentration progressed in a roughly linear fashion with a doubling of the concentration halving the sensitivity. The slightly higher value achieved with the 14% PIB without lecithin versus the same concentration with lecithin could have indicated the surfactant increased the flexibility of the polymer by acting as a plasticizer and lowering the resistance to mechanical force.

The actions of the agent could be considered two-fold with PIB lowering the resistance impact and, therefore, initiation and the solvent carrier reducing the particle size of the TATP. Larger crystals of TATP, frequently formed by sublimation, display increased sensitivity. As the solvent evaporated after application, the relative acetone concentration increased and solvation of the TATP lowered the crystal size, followed by completion of encapsulation by the PIB. The process was visually observable in the TATP test samples.

A subsequent set of sample were submitted for sensitivity and stability testing. The agents used were PIB, Beeswax, and a mixture of 50% PIB and 50% Beeswax. All agent solutions contained lecithin. For comparison, neat PETN was also tested. The results of the impact testing are listed in Table 3 below.

TABLE 3

| Results of Second Sample Set Impact Testing | |
|---|---|
| Agent | Impact Results |
| 10% Beeswax/5.2% Lecithin | 6.2 cm |
| 15% Beeswax/5.2% Lecithin | 5.6 cm |
| 20% Beeswax/5.2% Lecithin | 5.9 cm |
| 30% Beeswax/5.2% Lecithin | 7.1 cm |
| 10% Mix/5.2% Lecithin | 9.8 cm |
| 15% Mix/5.2% Lecithin | 7.1 cm |
| 20% Mix/5.2% Lecithin | 10.7 cm |
| 30% Mix/5.2% Lecithin | 11.2 cm |
| 30% PIB/5.2% Lecithin | 10.7 cm |
| PETN | 18.5 cm |

As can be seen in Table 3, the Beeswax at 10-20% produced impact test results on par with neat TATP and only a slight effect on sensitivity at 30%. The results appear to reinforce the entropic explosion model of TATP where propagation into an explosion is by volume work, rather than thermal propagation, as with classic explosives such as PETN where the wax acts as a transient thermal insulator. The brittle wax, therefore, failed to significantly dissipate impact forces and reduce the degree of initiation.

The combination PIB/Beeswax, while affording some degree of desensitization, did not increase sensitivity to the same level as the 20% PIB (13 cm) in the initial sample. The failure of the Beeswax fraction, comprising 50% of the agent weight in the mixes, to effectively desensitize TATP would account for the performance of the mixes. The 30% mix, however, did generate a slightly greater value than the 30% PIB, though the difference could have been due to testing precision. As can be seen in the result for PETN, none of the concentrations in the first or second sample set reduced sensitivity to the level of the secondary explosive.

The failure of the 30% PIB to decrease sensitivity proportionally, as exhibited in the first sample set, was thought to be due to crystal growth or the increased amount of lecithin or a combination of both factors. The first set of samples was tested two days after sample composition; the second set was not tested until ten days after composition. During this period, the tendency of TATP to sublime could have increased the overall size of the crystalline population. Additionally, the greater amount of lecithin acting as a plasticizer could have degraded the ability of the PIB to act as a mechanical buffer and decrease the degree of initiation. To test whether either phenomena was affecting the efficiency of the PIB desensitizing agent, a final sample set was submitted for testing consisting of 30% PIB with a lower lecithin percentage and 30% PIB without lecithin. Both specimens were tested for impact sensitivity immediately after composition and the results are listed in Table 4.

TABLE 4

Results of Third Sample Set Impact Testing

| Agent | Impact Results |
|---|---|
| 30% PIB/.3% lecithin | 11 cm |
| 30% PIB | 12 cm |

As can be seen in Table 4, the results obtained for the mixes approximate the values obtained for the earlier 14% and 20% PIB with no significant decrease in sensitivity afforded by the additional PIB. As with the earlier 14% PIB with and without lecithin, the sample without lecithin gave a slightly higher result suggesting the material may be acting as a plasticizer decreasing the ability of the PIB to absorb the mechanical force of the impact. Since the samples were tested immediately after composition, sensitivity induced by increased crystal growth was not indicated.

Stability Testing

Nine TATP samples underwent testing by DSC. Samples treated with PIB with and without lecithin, Beeswax, and a mixture of PIB and Beeswax were tested. None of the materials rendered the compound less stable though some alterations in thermal behavior were noted.

CONCLUSIONS

The addition of PIB to TATP lowered the impact sensitivity of the explosive over two-fold as indicated by Bruceton impact test results. The greatest decrease in sensitivity was obtained with a 20% PIB/lecithin mixture with a drop distance of 13 cm versus 5.7 cm for neat TATP and approximately 5.8 cm for TATP treated with 30% WD-40, a commonly used LSF. A higher concentration of PIB (30%) did not appear to afford greater desensitization. The use of lecithin to enhance encapsulation appeared to slightly decrease the ability of the PIB to desensitize the TATP, possibly by acting as a plasticizer and decreasing the ability of the polymer to absorb impact.

The addition of Beeswax to TATP samples did not appreciably lower sensitivity to impact as the brittle was did not absorb the associated mechanical forces. The results would seem to confirm the entropic mechanism for TATP propagation into an explosion versus a mechanism where propagation is thermally driven. As with the PIB samples, none of the Beeswax samples exhibited incompatibility with TATP as determined by DSC.

The results herein meet all of the aforementioned objectives of a desensitizing agent to decrease the sensitivity of explosives to impact, friction, and ESD; being composed of non-toxic, inexpensive components requiring a relatively small amount to achieve desensitization; being easily dispensable for quick, thorough application on-site; and is chemically compatible with improvised or conventional explosives.

The action of the lecithin on the performance of PIB indicates the use of a polymer with greater mechanical resistance could provide greater desensitization of TATP and meet the goal of lowering the compound's sensitivity to the level of a secondary explosive. PIB of a differing molecular weight or another polymer with a mechanically more rigid backbone could provide this resistance. Polymers chosen would have to be soluble in a solvent vehicle which allows easy application, quickly volatizes, and is compatible with explosives, etc.

Although the present disclosure has been illustrated and described herein with reference to exemplary embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

Finally, any numerical parameters set forth in this Specification and the attached Claims are approximations (for example, by using the term "about") that may vary depending upon the desired properties sought to be obtained by the present invention. At the very least, and not as an attempt to limit the application of the doctrine of equivalents to the scope of the Claims, each numerical parameter should be construed in light of the number of significant digits and by applying ordinary rounding.

What is claimed is:

1. A desensitizing agent for desensitizing use on improvised and conventional explosives, comprising:
   a solution of polyisobutylene and a dispersing agent in a mixture of organic solvents and lecithin being in one of a liquid and an aerosol form for application to an explosive for desensitizing the explosive from impact, friction, and electrostatic discharge in a field environment,
   wherein the solution is comprised of the polyisobutylene and the lecithin in a predetermined concentration ratio by percentage by weight, and
   wherein the mixture of the organic solvents comprises acetone/petroleum ether.

2. The desensitizing agent of claim 1, wherein the improvised explosive comprises triacetone triperoxide (TATP).

3. The desensitizing agent of claim 1, wherein the solution comprises a 20% concentration of polyisobutylene.

4. The desensitizing agent of claim 1, wherein the solution comprises a 2% concentration of the lecithin.

5. The desensitizing agent of claim 1, wherein the solution comprises a 20% concentration of the polyisobutylene; and a 2% concentration of the lecithin.

6. The desensitizing agent of claim 1, wherein the solution is comprised of the polyisobutylene and the lecithin in a 10:1 concentration ratio by percentage by weight.

7. The desensitizing agent of claim 1, wherein the solution is comprised of a 20% polyisobutylene/lecithin mixture.

\* \* \* \* \*